United States Patent [19]
Koike et al.

[11] Patent Number: 4,476,507
[45] Date of Patent: Oct. 9, 1984

[54] MAGNETIC CARD TRANSPORTING APPARATUS

[75] Inventors: Hiroyuki Koike, Saitama; Shigehiro Kato, Chichibu, both of Japan

[73] Assignees: Canon Kabushiki Kaisha, Tokyo; Canon Denshi Kabushiki Kaisha, Saitama, both of Japan

[21] Appl. No.: 339,520

[22] Filed: Jan. 15, 1982

Related U.S. Application Data

[63] Continuation of Ser. No. 098,761, Nov. 30, 1979, Pat. No. 4,358,103, which is a continuation of Ser. No. 872,154, Jan. 25, 1978, abandoned.

[30] Foreign Application Priority Data

Feb. 4, 1977 [JP] Japan .................... 52-11281
Feb. 4, 1977 [JP] Japan .................... 52-11282
Feb. 4, 1977 [JP] Japan .................... 52-11283
Feb. 4, 1977 [JP] Japan .................... 52-11284
Feb. 4, 1977 [JP] Japan .................... 52-11285
Feb. 4, 1977 [JP] Japan .................... 52-11286

[51] Int. Cl.³ .................... G11B 5/48; G11B 25/04
[52] U.S. Cl. .................... 360/104; 360/2
[58] Field of Search .................... 360/2, 88, 71, 104; 271/248, 274, 250

[56] References Cited

U.S. PATENT DOCUMENTS 2,273,289 2/1942 Rouan ........................... 271/248
3,836,753 9/1974 Pass ............................. 360/2 X
3,893,182 7/1975 Schmidt ........................ 360/88
3,964,739 6/1976 Garcia ......................... 271/250 X Primary Examiner—John H. Wolff
Attorney, Agent, or Firm—Fitzpatrick, Cella, Harper & Scinto

[57] ABSTRACT

This invention provides a reference member for supporting and giving reference positions to principal components, i.e. a feed roller for transporting magnetic cards, a driver for driving said feed roller and a member for pressing magnetic cards against the feed roller. Further the reference member supports a card support for placing the magnetic card by one side of the support, the pressing member through a biasing member, and a magnetic head for information writing or reading. A limiting member for blocking the displacement of the magnetic head is composed as a part of the pressing member, and a lateral pressure plate and a counter-plate are provided to ensure stable transport of the magnetic card. In this manner error in information writing or reading are prevented by a simplified composition.

5 Claims, 11 Drawing Figures

MAGNETIC CARD TRANSPORTING APPARATUS

This is a continuation of application Ser. No. 98,761, filed Nov. 30, 1979, now U.S. Pat. No. 4,358,103, which is in turn a continuation of application Ser. No. 872,154, filed on Jan. 25, 1978, now abandoned.

BACKGROUND OF THE INVENTION

1. Field of the Invention

The present invention relates to a card transporting mechanism adapted for use in a magnetic card transporting apparatus enabling accurate information writing or reading on magnetic cards and realizing determined functions with a simple structure thereby improving reliability and reducing costs.

2. Description of the Prior Art

Conventional magnetic card transporting apparatus are provided with frame plates on both sides of the path for guiding the magnetic cards, both faces of said frame plates being utilized for installing principal components. In such apparatus the movement of the pressing the means for pressing magnetic card against the feed roller is limited to one direction, and it has been necessary to adjust the position of the magnetic head according to the thickness of the magnetic card in order to avoid eventual shock on the magnetic head by collision with the magnetic card upon insertion thereof. Also there resulted swaying of the magnetic card upon transport thereof, and an increased frictional resistance upon transport if the magnetic card is not flat. As explained above the conventional magnetic card transporting apparatus not only include many components requiring costly precision during and resulting in inferior efficiency in assembly, adjustment and maintenance but also are often unable to perform smooth transport of magnetic cards, eventually leading to errors in information writing or reading.

SUMMARY OF THE INVENTION

A first object of the present invention is to improve the positional accuracy of the components thereof and to improve the efficiency in the assembly, adjustment, maintenance and inspection.

A second object of the present invention is to simplify the component parts and to reduce the cost.

A third object of the present invention is to reduce the shock on the magnetic head upon coming in engagement with the magnetic card regardless of the thickness thereof.

A fourth object of the present invention is to prevent "swaying" of the magnetic card thereby preventing errors in information writing or reading.

A fifth object of the present invention is to ensure smooth transport of the magnetic card even when it is not flat.

BRIEF DESCRIPTION OF THE DRAWINGS

The attached drawings illustrate the magnetic card transporting apparatus of the present invention wherein.

DESCRIPTION OF THE PREFERRED EMBODIMENTS

Now the present invention will be detailedly explained in the following while making reference to FIGS. 1–6.

Figure 1:
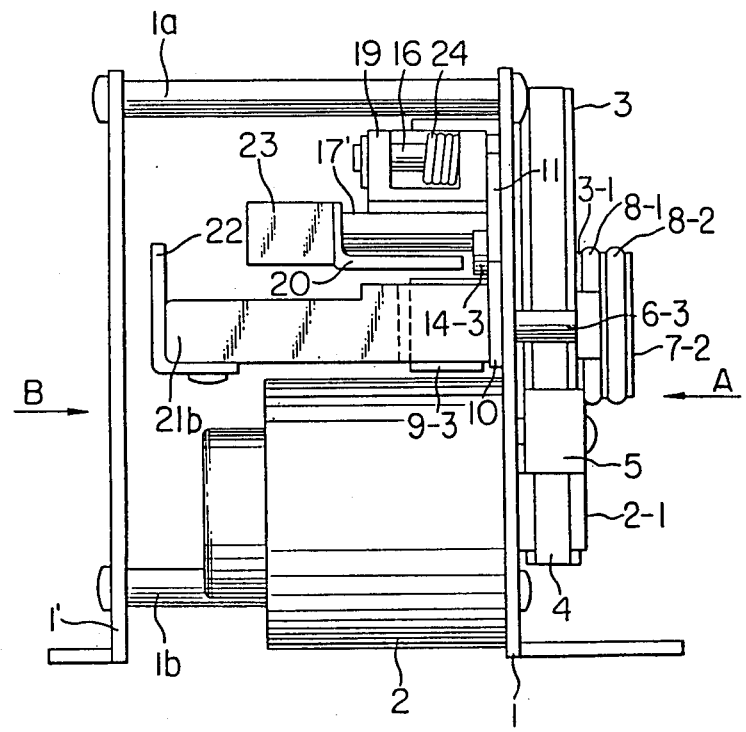
FIG. 1 is a rear view of the magnetic card transporting apparatus of the present invention.

In the magnetic card transporting apparatus shown in FIG. 1, a motor 2 (drive means) is fixedly supported by a reference plate 1 (reference member) in such a manner that the drive shaft 2-1 of said motor 2 passes through said reference plate 1. A support plate 1' is mounted on the end of rods 1a, 1b and an unrepresented rod is mounted on the reference plate 1 to cover one side of the apparatus but does not carry any components relating to the functions of the present apparatus.

Figure 2:
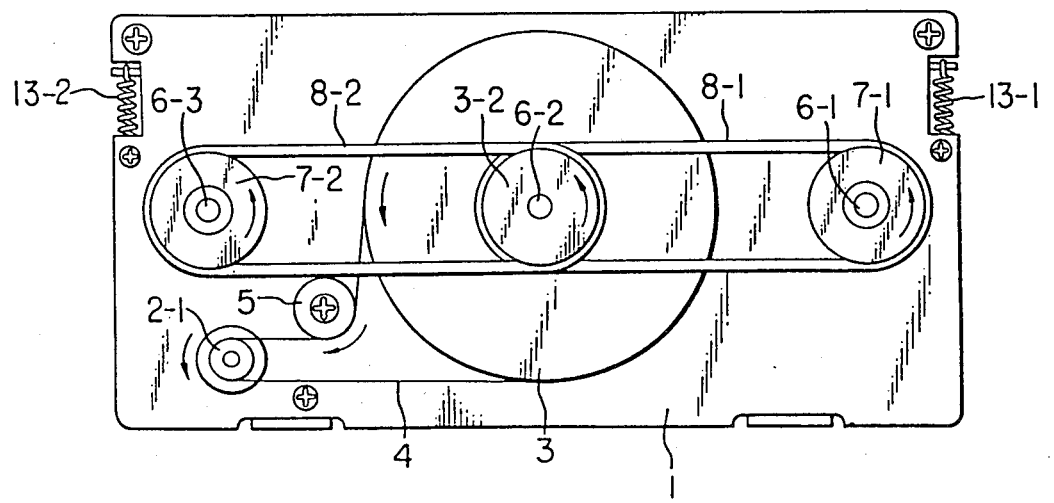
FIG. 2 is a lateral view of the magnetic card transporting apparatus of the present invention.

Now an explanation will be given on the transmission of drive force while referring to FIG. 2 showing a lateral view of the apparatus of FIG. 1 seen from the direction A. Between the shafts 2-1 of the motor 2 (FIG. 1) and a flywheel 3 there is strung a belt 4, made of a polyester tape, which is maintained under a tension by a roller 5 rotatably supported on the reference plate 1.

On the reference plate 1 there are rotatably supported shafts 6-1, 6-2 and 6-3 on which respectively supported are a pulley 7-1, the flywheel 3 and a pulley 7-2.

Said flywheel 3 is provided with pulleys 3-1 and 3-2 structured integral therewith, and belts 8-1 and 8-2 are respectively strung between the pulleys 3-1 and 7-1 and between the pulleys 3-2 and 7-2. Thus a counter-clockwise rotation of the shaft 2-1 of motor 2 rotates the roller 5 clockwise and the flywheel 3 counter-clockwise, and the resulting counter-clockwise rotation of the pulleys 3-1, 3-2 integral with said flywheel 3 causes the pulleys 7-1, 7-2 to rotate counter-clockwise. As the pulleys 7-1, 3-1, 3-2 and 7-2 are of approximately the same diameters, the shafts 6-1, 6-2 and 6-3 fixed to said pulleys rotate counter-clockwise at approximately the same speeds.

Figure 3:
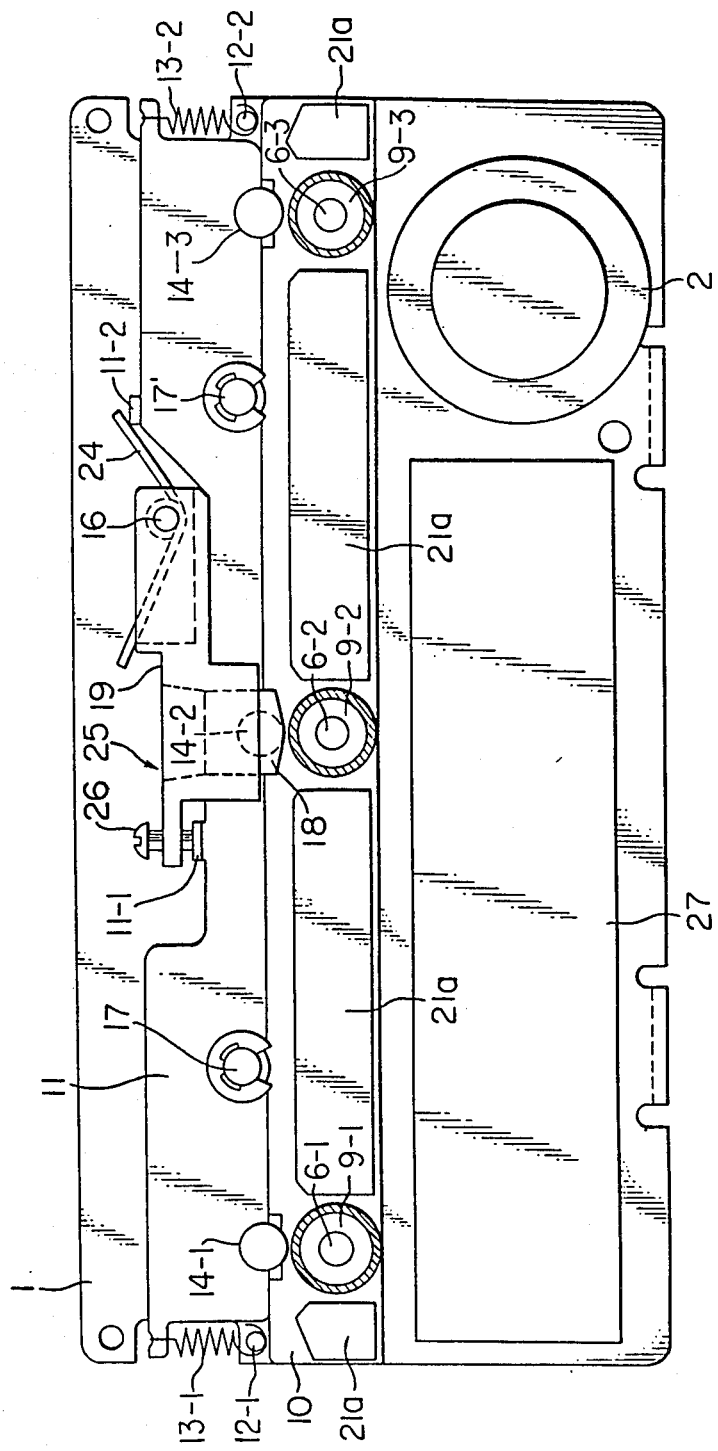
FIG. 3 is an internal lateral view of the magnetic card transporting apparatus of the present invention.

Now reference is made to FIG. 3 which is a lateral view of the interior of the apparatus in FIG. 1 seen from the direction B, wherein the rods 1a, 1b and afore-mentioned unrepresented rod as well as the support plate 1' are eliminated for clarity.

In FIG. 3 the shafts 6-1, 6-2 and 6-3 rotatably mounted on the reference plate 1 are same as those shown in FIG. 2 but observed from the opposite ends thereof.

Consequently the shafts 6-1, 6-2 and 6-3 in FIG. 3 rotate clockwise at approximately the same speeds, and feed rollers 9-1, 9-2 and 9-3 are respectively fixed on said shafts.

Figure 4A:
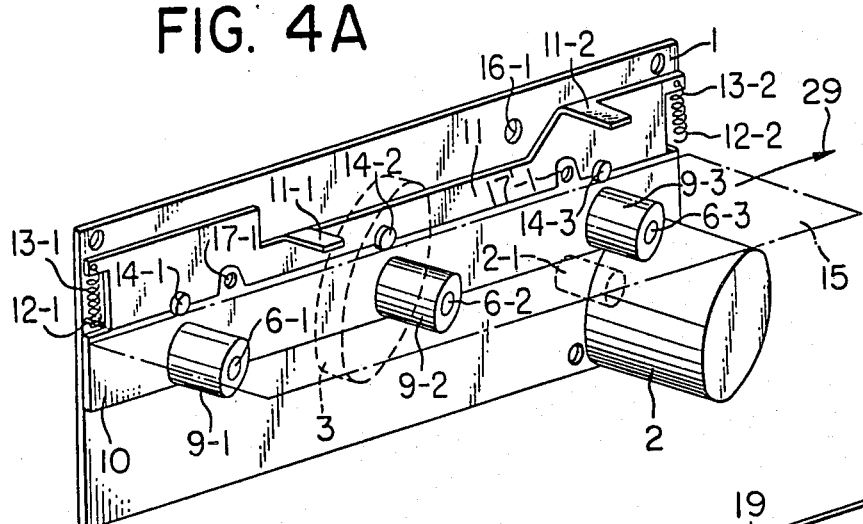
FIGS. 4A, 4B and 4C are an exploded perspective view of the magnetic card transporting apparatus of the present invention wherein a part of components is omitted.
Figure 4B:
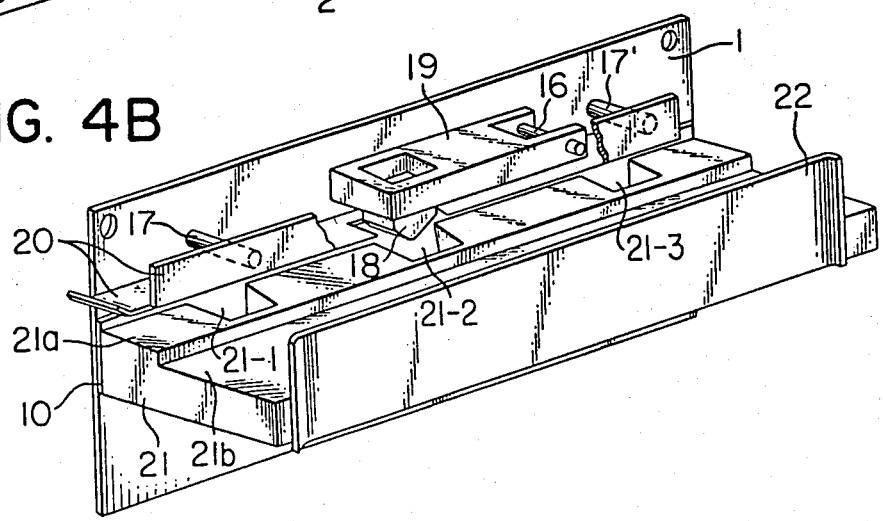
Figure 4C:
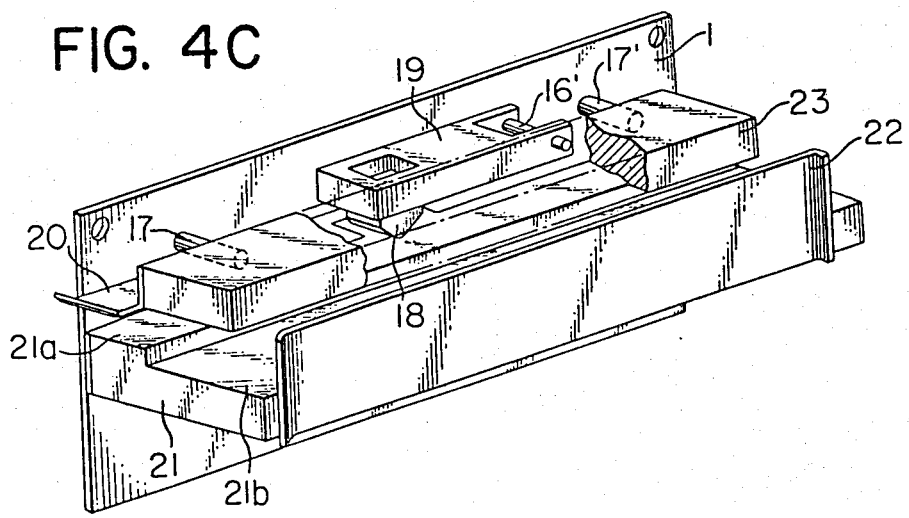

FIGS. 4A, 4B and 4C represent an exploded perspective view of the apparatus wherein some components are omitted for clarity.

In FIG. 4A there is shown the reference plate 1 to which is fixed a guide plate 10 on which is placed a lever plate 11 provided with folded portions 11-1 and 11-2.

On the reference plate 1 there are fixed pins 12-1 and 12-2, and a spring 13-1 is strung between said pin 12-1 and an end of said lever plate 11 while an another spring 13-2 is strung between said pin 12-2 and the other end of said lever plate 11, so as to press the lower face of said lever plate 11 against the upper face of the guide plate 10, thereby defining the reference position of the lever plate 11 with respect to the reference plate 1. Said lever plate 11 (support member) rotatably supports press rollers (pressing member) 14-1, 14-2 and 14-3, whereby the pressing means are constituted by said lever plate and said press rollers.

Said press rollers 14-1, 14-2 and 14-3 are respectively arranged in facing relationship with said feed rollers 9-1, 9-2 and 9-3 with a spacing therebetween smaller than the thickness of a magnetic card (not shown). Furthermore the distances between the feed rollers 9-1 and 9-2, between the feed rollers 9-2 and 9-3, between the press rollers 14-1 and 14-2, and between the press rollers 14-2 and 14-3 are selected shorter than the length of a magnetic card in the advancing direction (arrow 29) thereof, whereby the magnetic card (not shown) is pinched by at least a pair of the feed rollers 9-1, 9-2, 9-3 and press rollers 14-1, 14-2, 14-3 and transported on the transport surface 15 along the direction of arrow 29.

On the reference plate 1 there are provided holes 16-1, 17-1 and 17'-1 in which shaft 16 and rods 17 and 17' are fixed by an end thereof (FIG. 4B).

Now referring to FIG. 4B, on the shaft 16 there is rotatably fitted an end of a box-shaped lever 19 on which a magnetic head 18 is mounted, and on the other ends of said rods 17, 17' there is fixed a card counter plate 20 of an L-shape composed of a resilient material. On the side face of said card guide plate 10 there is supported a card support 21 by one side thereof at the shouldered end 21a thereof, in which are formed recesses 21-1, 21-2 and 21-3 for respectively accommodating aforementioned feed rollers 9-1, 9-2 and 9-3. Said shouldered end portion 21a of the card support 21 is so constructed as to have a width smaller than the width of a magnetic card in a direction perpendicular to the advancing direction thereof, so that a part of said magnetic card faces a recessed portion 21b of the card support 21. On the end of the card support at the side of said recessed portion 21b there is fixed a card side pressure plate 22 of a resilient material for pressing a lateral end of the magnetic card.

At the other ends of said rods 17, 17' and on said card counter plate 20 there is further provided a casing 23 of a shape as shown in FIG. 4C and accommodating an unrepresented detecting element for detecting the position of said magnetic card. In FIG. 4C, the shouldered portion 21a and the recessed portion 21b of the card support 21 respectively face said card counter plate 20 and said casing 23.

Now there will be given an explanation on the components omitted in FIGS. 4A, 4B and 4C, while making reference again to FIG. 3.

On the shaft 16 there is mounted a spring 24 the extremeties of which function to bias the folded portion 11-2 and box-shaped lever 19, whereby said magnetic head 18 mounted on said lever 19 is biased in the direction of arrow 25 around the axis 16.

On the other end of said box-shaped lever 19 there is provided a screw 26 the tip of which is maintained in contact with the folded portion 11-1 (limiting member).

In this manner the magnetic head 18 is prevented from contacting the feed roller 9-2 and is located at a distance from said roller 9-2 smaller than the thickness of a magnetic card (not shown) by regulating the protruding length of said screw 26. An electric circuit 27 necessary for signal processing for the magnetic head 18 is mounted on the reference plate 1. Now there will be explained, with reference to FIGS. 5A, 5B and 5C, the function of the present magnetic card transporting apparatus at various card positions upon card insertion into the apparatus.

Figure 5A:
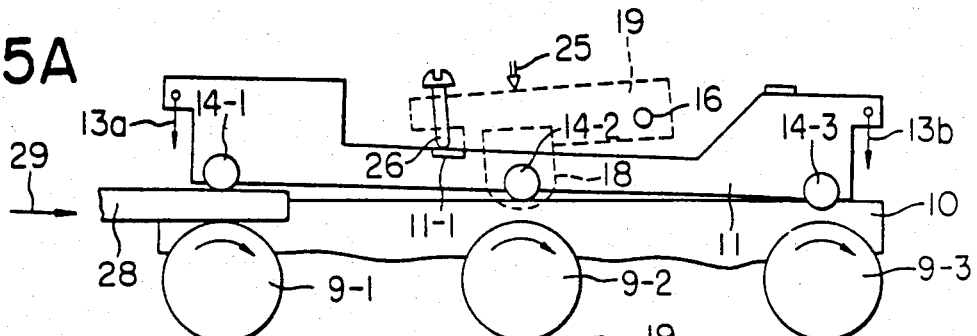
FIGS. 5A, 5B, 5C and 5D are lateral views representing various positions of the magnetic card when it is inserted into the magnetic card transporting apparatus of the present invention.
Figure 5B:
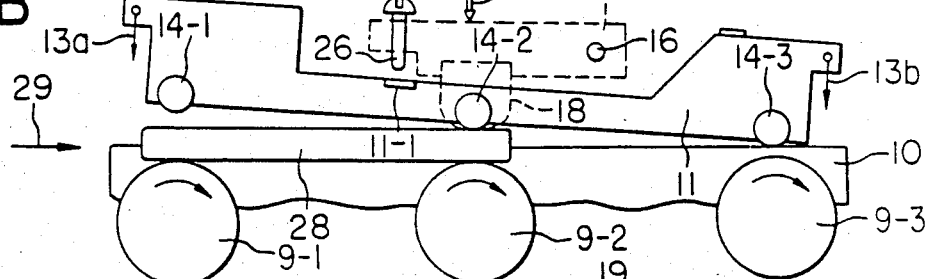
Figure 5C:
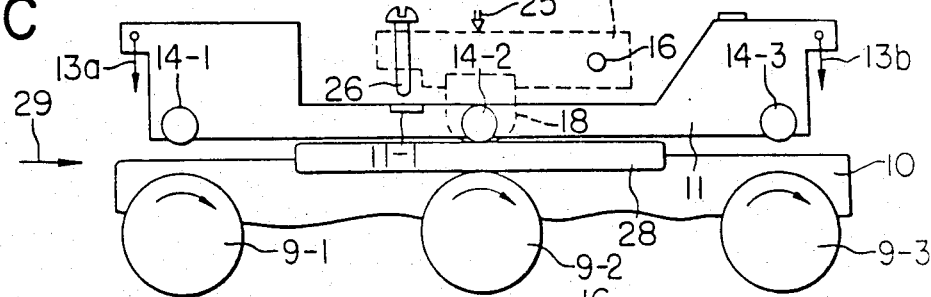
Figure 5D:
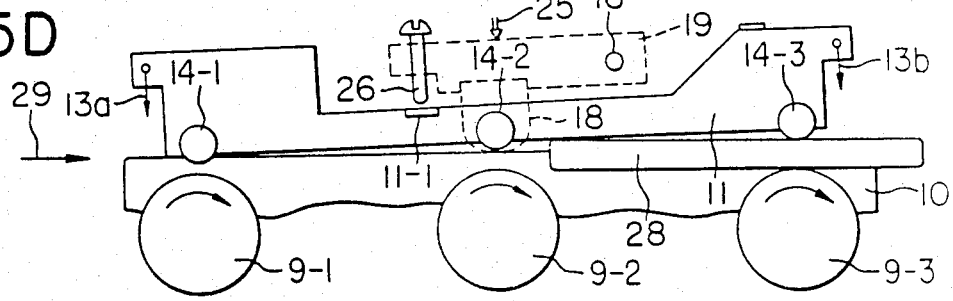

Now referring to FIGS. 5A, 5B and 5C abstracting solely the parts necessary for the description of roller function from FIG. 3, the distances between the feed rollers 9-1, 9-2 and 9-3 and the press rollers 14-1, 14-2 and 14-3, respectively, are previously adjusted to a value smaller than the thickness of a magnetic card 28.

Upon insertion of the magnetic card 28 into the apparatus from the left-hand end thereof as shown in FIG. 5A, said card is at first supported between the feed roller 9-1 and the press roller 14-1 with a reduced shock due to the presence of the above-mentioned distance. As the lever plate 11 is biased in the direction of arrows 13a and 13b by means of the springs 13-1 and 13-2 (FIG. 3), the press rollers 14-1, 14-2 and 14-3 are lifted in a direction opposite to the arrow 13a around the lower right end of the lever plate 11. Assuming that the thickness of magnetic card 28 is t (not shown) and the gaps at the feed rollers 9-1, 9-2 and 9-3 are respectively $d_1$, $d_2$ and $d_3$ (not shown), the relationship between these values can be represented by $t = d_1 > d_2 > d_3$. Same notations will be used in the following. Although the box-shaped lever 19 is biased in the direction of arrow 25 by means of the spring 24 (FIG. 3), the contact of the tip of screw 26 provided at the other end of said box-shaped lever 19 with the folded portion 11-1 of the lever plate 11 permits the magnetic head 18 to be maintained at a distance from the feed roller 9-2 smaller than the thickness of the magnetic card 28 to prevent the magnetic head 18 from contacting the feed roller 9-2, thereby reducing the shock upon coming into contact with the magnetic card. Since the feed rollers 9-1, 9-2 and 9-3 are rotated clockwise with approximately same speeds, the magnetic card 28 pinched between the feed roller 9-1 and the press roller 14-1 is transported in the direction of arrow 29. As the gap between the feed roller 9-2 and the press roller 14-2 is increased upon entry of the magnetic card 28 therebetween, the card is supported therebetween almost without shock.

FIG. 5B shows a state wherein the magnetic card 28 is pinched between the feed roller 9-2 and the press roller 14-2 upon above-mentioned advancement, whereupon the aforementioned dimensional relationship between the gaps momentarily becomes $d_1 > t = d_2 > d_3$. At the same time the magnetic card is also pinched between the feed roller 9-2 and the magnetic head 18. The aforementioned inclination of lever plate 11 lifts the folded portion 11-1 thereof which in turn lifts the box-shaped lever 19 through the screw 26 thereby reducing the shock on the magnetic head 18 upon coming into contact with the magnetic card 28. As a result the box-shaped lever 19 is lifted around the shaft 16 in a direction opposite to the arrow 25 and against the biasing force of the spring 24 (FIG. 3). Simultaneously the tip of said screw 26 becomes separated from the folded portion 11-1. Subsequently the gap relationship of feed rollers and press rollers becomes $d_1 = d_2 = d_3 = t$ whereupon the lever plate assumes a balanced position. In this state the magnetic head 18 is maintained under pressed contact with the magnetic stripe (not shown) of the magnetic card to perform information writing or reading.

The magnetic card 28 is further advanced in the direction of arrow 29 and becomes supported between the feed roller 9-3 and the press roller 14-3 almost without shock and the gap therebetween is already widened as mentioned above approximately same as the thickness of the magnetic card 28.

In the present magnetic card transporting apparatus there scarcely is a shock at the entry of magnetic card 28 between the feed roller 9-2 and the press roller 14-2 and at the release of the magnetic card 28 from said rollers. Also the presence of a flywheel 3 (FIG. 2) on the shaft 6-2 of feed roller 9-2 assures an extremely smooth transport of the magnetic card 28.

FIG. 5C shows a state wherein the magnetic card 28 after information writing or reading is further advanced between the feed roller 9-3 and press roller 14-3 for ejection whereupon the aforementioned gap relationship becomes $d_1 < d_2 < d_3 = t$.

Upon release of the magnetic card 28 from the feed roller 9-2 and the magnetic head 18, the box-shaped lever 19 moves in the direction of arrow 25 around the shaft 16 by means of the biasing force of the spring 24 until the tip of screw 26 mounted on the other end of said box-shaped lever 29 comes into contact with the folded portion 11-1 of the lever plate 11, whereby the magnetic head 18 mounted on the box-shaped lever 19 returns to the state shown in FIG. 5A. Upon further advancement of the magnetic card 28 and upon release thereof from the feed roller 9-3 and press roller 14-3, all the components return to the original state wherein the feed rollers 9-1, 9-2 and 9-3 are maintained at a distance from the press rollers 14-1, 14-2 and 14-3, said distance being previously adjusted to a value smaller than the thickness of the magnetic card 28. Further, as the transporting mechanism in the present magnetic card transporting apparatus, i.e. the feed rollers 9-1, 9-2, 9-3, press rollers 14-1, 14-2, 14-3 and lever plate are structured laterally symmetrical with respect to the feed roller 9-2 and to the press roller 14-2, the same effect can be expected if the magnetic card is inserted from the right-hand side with inverted rotation of the motor 2.

Figure 6:
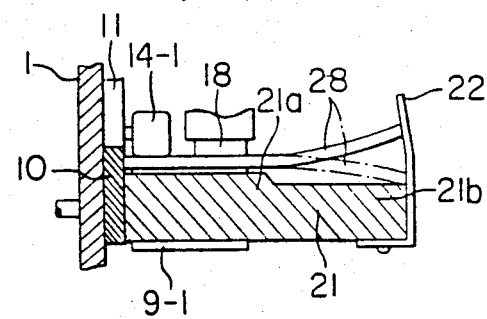
FIG. 6 is a frontal view of the principal part of the magnetic card transporting apparatus of the present invention.

Now referring to FIG. 6 which is a frontal view of the principal portion of the magnetic card transporting apparatus seen from the left-hand end in FIG. 4A or 4C, i.e. from the card inlet side, the magnetic card 28 placed on the shoulderd portion 21a of the card support 21 is pressed against the guide plate 10 by means of the card side pressure plate 22 and transported between the feed roller 9-1 and the press roller 4-1 in a direction perpendicular to the surface of the paper.

The magnetic cards can hardly be expected to remain flat as they are constantly carried by the users and frequently deformed into convex or concave shape. Such non-flat magnetic cards, upon insertion into a magnetic card devices, may result in an insufficient contact between the magnetic head 18 and the corresponding magnetic stripe (not shown) on the card depending on the state of said deformation, eventually leading to errors in the information writing or reading. With the structure of card support 21 with a shouldered portion 21a and a recessed portion 21b as shown in FIG. 6, the magnetic card 28, if downwardly bent as shown by the chain line, is relieved from upward force at the right-hand end because of the presence of said recessed portion 21b, thus assuring satisfactory contact between said magnetic stripe and the sliding face of the magnetic head 18. Also because of the presence at the right-hand end of the card support 21 of the card side pressure plate 22 made of a resilient material and formed in an approximately L-shape with the upper end portion leaning toward the magnetic card 28, a card upwardly bent at the right end as shown by the full line in FIG. 6 comes into contact at said right end with said side pressure plate 22 whereby the left end of card is pressed against the guide plate 10. As the result the magnetic stripe portion of the card 28 provided in facing relationship with the magnetic head 18 is pressed against the shouldered portion 21a of the card support 21.

As said shouldered portion 21a of the card support is so structured as to provide an ideal guide path for the sliding face (not shown) of the magnetic head 18, there is obtained an extremely good contact between said magnetic stripe and the magnetic head 18. Also the shock at the entry of the card between the feed roller 9-2 and the magnetic head 18 is reduced, and the errors in information writing or reading are avoided. In addition to the fact that the magnetic card 28 is pressed by the side pressure plate 22 in a direction perpendicular to the advancing direction of said card as explained in the foregoing, it is to be noted that there is provided, with respect to the vertical direction, the card counter plate 20 (FIGS. 4B and 4C) which is spaced from the card support 21 by a distance slightly larger than the thickness of the magnetic card, thereby allowing, in normal condition, the advancement of magnetic card 28 without contact with said counter plate 20. In case of a deformed card eventually contacting with the counter plate 20, it exerts an elastic force on the contacting portions of such card toward the card support 21. Simultaneously, the card counter plate 20 is slightly bent in a direction opposite to the card support 21, thereby avoiding the increase in the frictional resistance between the card 28 and the counter plate 20 and assuring smooth card transport.

The magnetic card transport apparatus of the present invention provides an improved positional accuracy of components as all the principal components are mounted on the reference plate as detailedly explained in the foregoing. For example the motor shaft 2-1, roller 5, shafts 6-1, 6-2 and 6-3, holes 16-1, 17-1 and 17'-1 are positioned on the reference plate 1, while the press rollers 14-1, 14-2 and 14-3, and folded portions 11-1 and 11-2 are positioned on the lever plate 11 which is resiliently supported by the reference plate 1 through springs 13-1, 13-2 and the lower face of which is movable with respect to the upper reference face of the guide plate 10 affixed on the reference plate 1. This structure not only simplifies the components and enables cost reduction but also allows easy maintenance and inspection simply by removing the support plate 1' shown in FIG. 1. Said support plate 1' can further be a mounting plate belonging to another instrument for installing the magnetic card transporting apparatus thereon.

Furthermore, as each press roller is rotatably supported on the lever plate which in turn is supported by said reference plate through biasing means, the pressing means composed of said press roller and lever plate has no fixed rotational center and is therefore free from any movemental limitation. Also said press rollers, being movable integrally with the displacement of said pressing means, can be utilized for detecting the insertion of magnetic card thereby achieving further smoother transport of the cards.

Furthermore the simplified structure with reduced number of components provides reduced production cost and improved reliability.

Also said pressing means is not necessarily limited to those including press rollers but can also be designed to utilize other means, for example brushes.

As said magnetic head 18 is biased by means of the spring 24 acting on the folded portion 11-2 within the lever plate 11, the pressing force of said magnetic head on the magnetic card is further increased by the displacement of the pressing means, composed of support member (lever plate) and pressing member (press rollers) upon insertion of the magnetic card, since the biasing of the spring 24 (resilient member) is increased by said folded portion 11-2. It is thus rendered possible to maintain a relatively weak biasing force in normal time and to generate a stronger biasing force upon insertion of the magnetic card.

The aforementioned limiting member is composed of the folded portion 11-1 provided on the lever plate 11 so as to engage the screw 26 at the side of the magnetic head 18.

Upon insertion of a magnetic card, a displacement of said pressing means modifies the position of the magnetic head through said limiting member. In this manner the position of the magnetic head is automatically regulated according to the thickness of the magnetic card.

The aforementioned card side pressure plate provided over approximately the entire length of the magnetic card apparatus allows stable transport of magnetic cards and also realizes satisfactory contact between the magnetic stripe and magnetic head, even with un-flat magnetic cards, thus assuring information writing or reading with said magnetic head.

The use of a resilient member (counter plate) in at least one of the guide means provided on and under the path shows little increase in the frictional resistance at the transport of even un-flat cards, thereby enabling smooth card transport.

What we claim is:

1. An apparatus for transporting a magnetic card, comprising:
   a transport roller for transporting the magnetic card;
   means for driving said transport roller;
   a base member for supporting said transport roller and said driving means;
   a support member supported by an urging member and having a predetermined reference position with respect to said base member;
   a pressing member, supported by said support member, for pressing the magnetic card to said transport roller;
   a magnetic head having one end in engagement with said support member and another end pivotally supported on said base member to be movable in accordance with movement of said support member;
   a resilient member for urging said magnetic head against the magnetic card; and
   a limiting member, mounted on said support member, for displacing said magnetic head in accordance with the thickness of the magnetic card sandwiched by said transport roller and said pressing member.

2. An apparatus according to claim 1, wherein said resilient member is supported between said magnetic head and said support member.

3. An apparatus for transporting a magnetic card, comprising:
   a plurality of transport rollers for transporting the magnetic card;
   means for driving at least one of said transport rollers;
   a base member for supporting said transport rollers and said driving means;
   a support member supported by an urging member and having a predetermined reference position with respect to said base member;
   a first pressing member, supported by said support member, for pressing the magnetic card to one of said transport rollers;
   a second pressing member supported by said support member to oppose another of said transport rollers and displaceable in accordance with the thickness of the magnetic card sandwiched by said one of the transport rollers and said first pressing member;
   a magnetic head having one end in engagement with said support member and another end pivotally supported on said base member to be movable in accordance with movement of said support member;
   a resilient member for urging said magnetic head to press it against the magnetic card; and
   a limiting member, mounted on said support member, for displacing said magnetic head in accordance with the thickness of the magnetic card sandwiched by said one of the transport rollers and said first pressing member.

4. An apparatus according to claim 3, wherein said resilient member is supported between said magnetic head and said support member.

5. An apparatus according to claim 3, wherein said first and second pressing members include rollers.

* * * * *